United States Patent
Sugahara (10) Patent No.: US 10,543,632 B2
(45) Date of Patent: Jan. 28, 2020

(54) INJECTION MOLDING MACHINE

(71) Applicant: FANUC CORPORATION, Yamanashi (JP)

(72) Inventor: Keisuke Sugahara, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 53 days.

(21) Appl. No.: 15/978,241

(22) Filed: May 14, 2018

(65) Prior Publication Data

US 2019/0030773 A1 Jan. 31, 2019

(30) Foreign Application Priority Data

Jul. 27, 2017 (JP) .................. 2017-145117

(51) Int. Cl.
*B29C 45/17* (2006.01)
*B29C 45/07* (2006.01)

(52) U.S. Cl.
CPC ...... *B29C 45/1777* (2013.01); *B29C 45/1744* (2013.01); *B29C 45/1775* (2013.01);
(Continued)

(58) Field of Classification Search
CPC ............ B29C 45/1777; B29C 45/1744; B29C 2045/644; B29C 45/64; B29C 45/1775;
(Continued)

(56) References Cited

U.S. PATENT DOCUMENTS 3,887,312 A * 6/1975 Seary .................... B29C 45/231
425/3

4,386,903 A * 6/1983 Wybenga ............ B29C 45/1777
264/328.11

(Continued)

FOREIGN PATENT DOCUMENTS

| DE | 103 37 785 B3 | 11/2004 |
|----|---|---|
| JP | H08-001062 Y2 | 1/1996 |
| JP | 2001-038764 A | 2/2001 |

OTHER PUBLICATIONS

Office Action issued in JP 2017-145117; mailed by the Japanese Patent Office dated Jun. 11, 2019.
(Continued)

*Primary Examiner* — Xiao S Zhao
*Assistant Examiner* — Emmanuel S Luk
(74) *Attorney, Agent, or Firm* — Studebaker & Brackett PC (57) ABSTRACT

An injection molding machine includes, on a machine base, a mold having a stationary platen, an injection unit having a nozzle for injecting a molten material into the mold, a nozzle touch mechanism for pressing the nozzle against the mold, and a connecting member for connecting the nozzle touch mechanism and the stationary platen. The connecting member has a support base and an arm part, and also has a first connecting part to be connected to the nozzle touch mechanism on the support base, and a second connecting part to be connected to the stationary platen on an upper part of the arm part. The injection molding machine is configured so that a nozzle touch force is transmitted to the nozzle touch mechanism via the stationary platen and the connecting member. The second connecting part of the connecting member is disposed to be rotatable in a direction along a moving direction of the injection unit.

6 Claims, 10 Drawing Sheets

(52) U.S. Cl.
CPC .... *B29C 45/1761* (2013.01); *B29C 2045/073* (2013.01); *B29C 2045/1765* (2013.01); *B29C 2045/1767* (2013.01)

(58) Field of Classification Search
CPC ...... B29C 2045/073; B29C 2045/1767; B29C 45/66; B29C 2045/1765; B29C 2045/1761
See application file for complete search history.

(56) References Cited

U.S. PATENT DOCUMENTS

| | | | | |
|---|---|---|---|---|
| 4,540,359 | A * | 9/1985 | Yamazaki | B29C 45/4005 425/135 |
| 5,044,927 | A * | 9/1991 | DiSimone | B29C 45/07 264/297.2 |
| 5,804,224 | A * | 9/1998 | Inaba | B29C 45/1777 425/150 |
| 6,039,559 | A * | 3/2000 | Eppich | B29C 45/1777 425/574 |
| 6,425,753 | B1 * | 7/2002 | Eppich | B29C 45/5008 425/574 |
| 6,524,095 | B1 * | 2/2003 | Ito | B29C 45/1777 425/574 |
| 2002/0132026 | A1 * | 9/2002 | Maurilio | B29C 45/1777 425/574 |
| 2002/0168443 | A1 * | 11/2002 | Bauer | B29C 45/1777 425/556 |
| 2003/0025247 | A1 * | 2/2003 | Schaffer | B29C 45/07 264/328.1 |
| 2003/0168198 | A1 * | 9/2003 | Pollak | B22D 17/22 164/312 |
| 2005/0008731 | A1 * | 1/2005 | Okazaki | B29C 45/1777 425/574 |
| 2005/0053686 | A1 * | 3/2005 | Nagaya | B29C 45/1777 425/149 |
| 2005/0084556 | A1 * | 4/2005 | Yoshioka | B29C 45/1777 425/149 |
| 2006/0127528 | A1 * | 6/2006 | Schmidt | B29C 45/07 425/574 |
| 2007/0087080 | A1 * | 4/2007 | Weinmann | B29C 45/07 425/574 |
| 2007/0235898 | A1 * | 10/2007 | Spicer | B29C 45/1744 264/299 |
| 2008/0088048 | A1 * | 4/2008 | Hayakawa | B29C 45/67 264/40.5 |
| 2008/0175938 | A1 * | 7/2008 | Teng | B22D 17/26 425/122 |
| 2009/0011073 | A1 * | 1/2009 | Nishimura | B29C 45/1744 425/595 |
| 2012/0128813 | A1 * | 5/2012 | Takemoto | B29C 45/07 425/574 |
| 2013/0129858 | A1 * | 5/2013 | Fujita | B29C 45/64 425/595 |
| 2014/0088757 | A1 * | 3/2014 | Inami | B29C 45/5008 700/200 |
| 2014/0141112 | A1 * | 5/2014 | Liu | B29C 45/17 425/167 |
| 2014/0161925 | A1 * | 6/2014 | Yoshioka | B29C 45/20 425/569 |
| 2015/0158222 | A1 * | 6/2015 | Kitta | B29C 45/1777 425/569 |
| 2017/0291342 | A1 * | 10/2017 | Dirneder | B29C 45/47 |
| 2017/0326770 | A1 * | 11/2017 | Hirose | B29C 45/1777 |
| 2017/0355116 | A1 * | 12/2017 | Sugahara | B29C 45/1777 |
| 2018/0290359 | A1 * | 10/2018 | Berlin | B29C 45/03 |
| 2018/0370101 | A1 * | 12/2018 | Schad | B29C 45/1742 |
| 2019/0152103 | A1 * | 5/2019 | Inoue | B29C 45/1761 |

OTHER PUBLICATIONS

Office Action issued in JP 2017-145117; mailed by the Japanese Patent Office dated Mar. 5, 2019.

An Office Action mailed by the German Patent Office dated Aug. 12, 2019, which corresponds to German Patent Application No. 10 2018 005 090.5 and is related to U.S. Appl. No. 15/978,241; with partial English language translation.

* cited by examiner

INJECTION MOLDING MACHINE

This application is based on and claims the benefit of priority from Japanese Patent Application No. 2017-145117, filed on 27 Jul. 2017, the content of which is incorporated herein by reference.

BACKGROUND OF THE INVENTION

Field of the Invention

The present invention relates to an injection molding machine having a nozzle touch mechanism.

Related Art

The injection molding machine forms moldings by injecting a molten material of resin or metal into a mold from a nozzle of an injection unit. The injection molding machine has, for example, a nozzle touch mechanism for moving an entire injection unit forward and rearward closer to or away from the mold, so as to press or separate the nozzle of the injection unit against or from the spool (injection port) of the mold.

In a conventionally-proposed injection molding machine, a nozzle touch mechanism and a stationary platen are connected by a connecting member having a substantially L shape in a side view, so that the connecting position with respect to the stationary platen is substantially set at the same height as the height of the nozzle (refer to Patent Document 1, as an example). In this injection molding machine, the nozzle touch force thereof is transmitted to the nozzle touch mechanism via the stationary platen and the connecting member.

Figure 10:
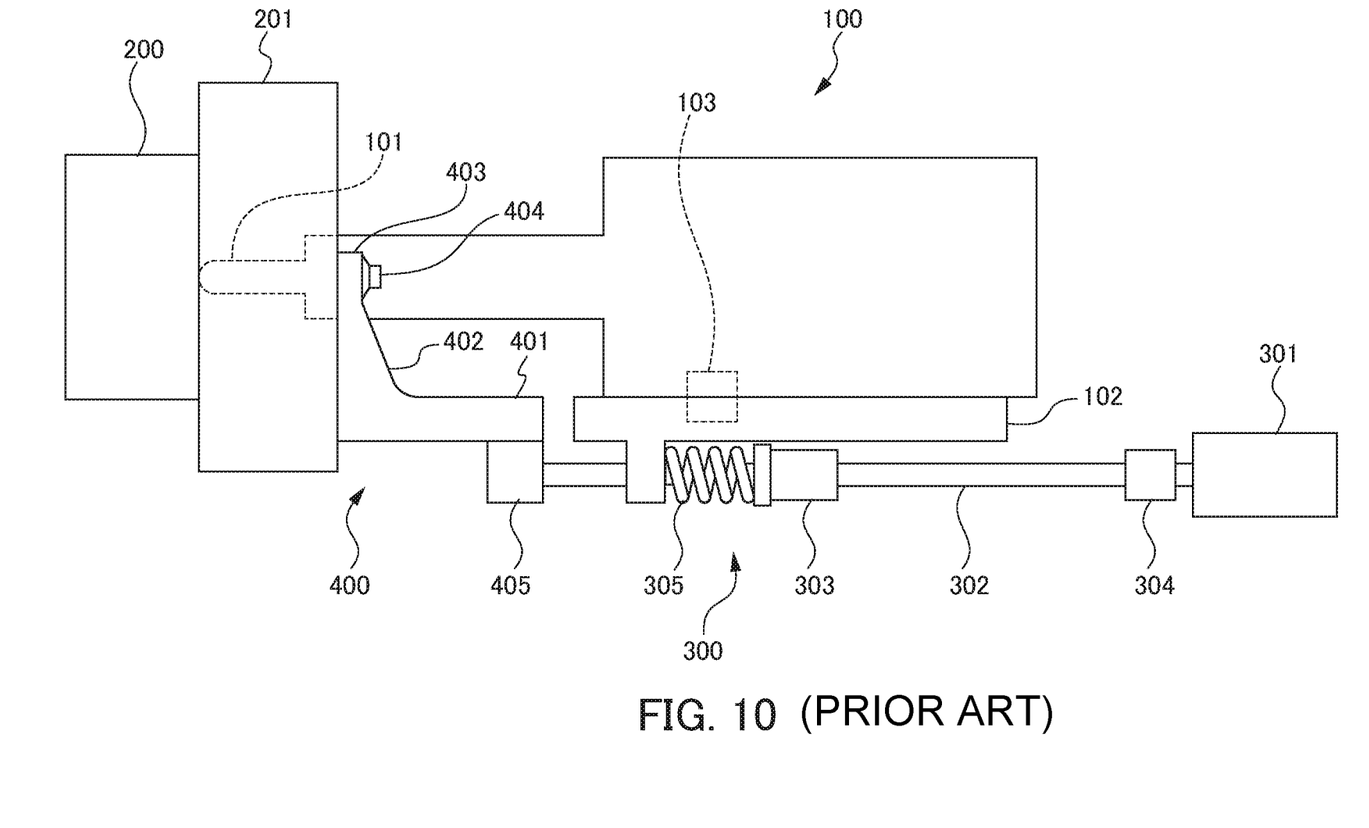
FIG. 10 is a diagram for explaining a nozzle touch mechanism of an injection molding machine having a conventional connecting member.

FIG. 10 is a diagram for explaining a nozzle touch mechanism of an injection molding machine having a conventional connecting member described in Patent Document 1. In the figure, a reference numeral 101 denotes a nozzle disposed at the tip of an injection unit 100; a reference numeral 200 denotes a mold; a reference numeral 201 denotes a stationary platen to which the mold 200 is attached; a reference numeral 300 denotes a nozzle touch mechanism; and a reference numeral 400 denotes a connecting member.

The nozzle touch mechanism 300 has a motor 301, a ball screw shaft 302, and a ball screw nut 303. One end of the ball screw shaft 302 is connected to the rotor shaft of the motor 301 via a coupling 304. The other end of the ball screw shaft 302 is connected to the connecting member 400. The ball screw nut 303 is screwed with the ball screw shaft 302, and is connected to a base 102 of the injection unit 100 via a spring 305 so as to be unrotatable with respect to the base 102.

The connecting member 400 is formed in a substantially L shape in a side view, having a support base 401 to be attached to a machine base, and a pair of right and left arm parts 402 (FIG. 10 shows only the visible front one of the arm parts 402) rising upward from the support base 401 in the side of the stationary platen 201. The upper portions of the arm parts 402 have connecting parts 403 to be connected to the stationary platen 201. The connecting parts 403 are disposed at substantially the same height as the nozzle 101 so as to be symmetrically relative to the nozzle 101. The connecting member 400 is fixed to the stationary platen 201 by bolts 404 at the connecting parts 403. The other end of the ball screw shaft 302 of the nozzle touch mechanism 300 is connected to the support base 401 of the connecting member 400 via a bearing part 405.

In the nozzle touch mechanism 300, when the ball screw shaft 302 rotates upon the rotation of the motor 301, the ball screw nut 303 screwed to the ball screw shaft 302 moves along the ball screw shaft 302. As a result, the injection unit 100 advances toward the stationary platen 201, and the nozzle 101 of the injection unit 100 touches the spool of the mold 200 attached to the stationary platen 201. The motor 301 further rotates to advance the ball screw nut 303, whereby the spring 305 is compressed. The injection unit 100 further advances by the compression reaction force, whereby the nozzle 101 is pressed against the mold 200.

The nozzle touch force when the nozzle 101 is pressed against the mold 200 is generated by a force to pull the connecting member 400 by the ball screw shaft 302, and is transmitted from the mold 200 to the central portion of the stationary platen 201. Since the connecting part 403 of the connecting member 400 to the stationary platen 201 is disposed at substantially the same height as the nozzle 101, a bending moment due to the nozzle touch force is hardly generated in the stationary platen 201.

Accordingly, the injection molding machine having the connecting member 400 has the following exemplary advantages. The stationary platen 201 does not fall down by the nozzle touch force, thereby hardly causing a defect such as partial contact to the mold 200 generated by the falling of the stationary platen 201. Since the connecting member 400 has a substantially L shape in a side view, the connecting member 400 does not hinder the rotation of the injection unit 100 in the horizontal direction around a swivel pin 103. Since the circumference of the nozzle 101 is in an open state, the circumference of the nozzle 101 is easily checked during the nozzle touch operation.

Patent Document 1: Japanese Unexamined Patent Application, Publication No. 2001-38764

SUMMARY OF THE INVENTION

Through a thorough investigation to further improve such a conventional injection molding machine, the inventor of the present invention has found that the connecting member may incline slightly in some cases, when the nozzle touch force is generated.

Figure 11:
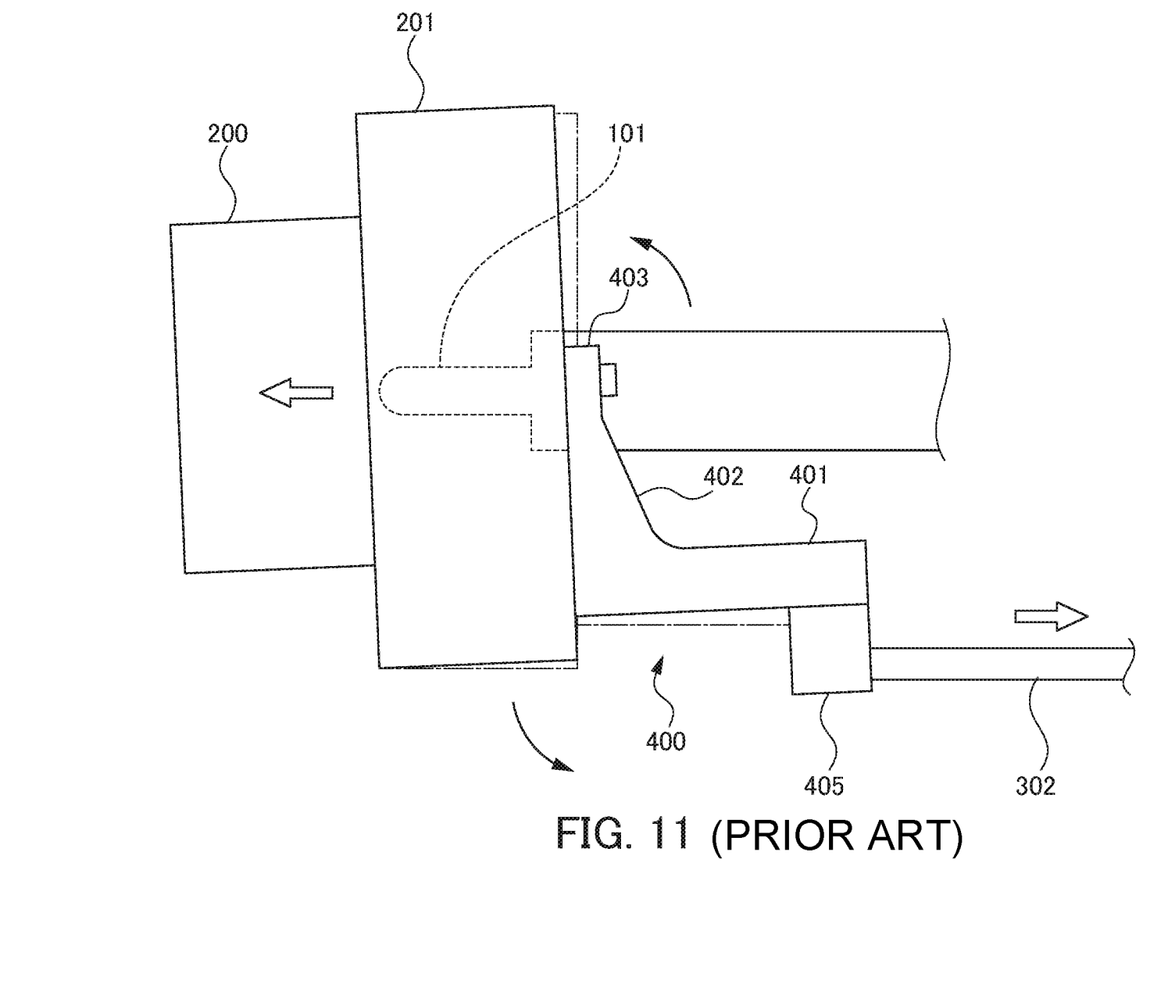
FIG. 11 is a diagram for explaining the connecting member in an inclined state in a nozzle touch mechanism of the injection molding machine having the conventional connecting member.

That is, when the nozzle touch force is generated, a strong tensile force acts on the connecting member 400 due to the rotation of the ball screw shaft 302. At this time, as shown in FIG. 11, the connecting member 400 may, in some cases, slightly incline to fall toward the side of the stationary platen 201 as shown by the arrow in the figure, due to a difference in height between the position of the bearing part 405 of the ball screw shaft 302 and each of the positions of the connecting parts of the connecting member 400 with respect to the stationary platen 201. Also, the connecting member 400 may, in some cases, slightly incline to fall toward the side of the stationary platen 201, due to slight deformation of the arm parts 402 of the connecting member 400 when the nozzle touch force is generated.

When the connecting member 400 inclines as described above, a moment is generated in a direction toward which the stationary platen 201 falls, as shown in FIG. 11. To suppress the generation of such a moment is a problem to be solved in order to maintain and improve the effects of preventing the stationary platen 201 from falling down due to the connecting member 400. It is noted that although the inclination of the connecting member 400 is extremely small, the inclination in FIG. 11 is illustrated with exaggeration for ease of understanding.

The present invention is to provide an injection molding machine, in which a stationary platen and a nozzle touch mechanism are connected by a connecting member having an arm part extending upward from a support base to be attached to a machine base, and in which a moment is hardly generated in a direction toward which the stationary platen falls even when the connecting member inclines upon generation of the nozzle touch force, thereby maintaining and improving the effects by the connecting member of preventing the stationary platen from falling.

(1) An injection molding machine (for example, an injection molding machine 1 described below) according to the present invention includes, on a machine base (for example, a machine base 2, a mold machine base 7 and an injection machine base 8, described below), a mold (for example, a mold 33 described below) having a stationary platen (for example, a stationary platen 31 described below), an injection unit (for example, an injection unit 4 described below) disposed to be capable of approaching or separating from the mold, the injection unit having a nozzle (for example, a nozzle 44 described below) for injecting a molten material into the mold in a state of the nozzle being pressed against the mold, a nozzle touch mechanism (for example, a nozzle touch mechanism 5 described below) for pressing the nozzle against the mold by applying a driving force to the injection unit to move the injection unit in a direction (for example, an approaching direction A1 described below) of approaching the mold, and a connecting member (for example, a connecting member 6 described below) for connecting the nozzle touch mechanism and the stationary platen. The connecting member has a support base (for example, a support base 61 described below) to be attached to the machine base and an arm part (for example, an arm part 62 described below) rising upward from the support base in a side of the stationary platen, and also has a first connecting part (for example, a bearing part 64 described below) to be connected to the nozzle touch mechanism on the support base, and a second connecting part (for example, a platen connecting part 67 described below) to be connected to the stationary platen on an upper part of the arm part. The injection molding machine is configured so that a nozzle touch force for pressing the nozzle against the mold is transmitted to the nozzle touch mechanism via the stationary platen and the connecting member, and the second connecting part of the connecting member is disposed to be rotatable in a direction along a moving direction (for example, a moving direction A described below) of the injection unit.

(2) In the injection molding machine according to (1), the support base of the connecting member may be attached to the machine base by an attachment part (for example, guide blocks 65 described below) at a position at least in a side of the injection unit relative to a position of the first connecting part along the moving direction of the injection unit.

(3) In the injection molding machine according to (1) or (2), the machine base may be divided into a mold machine base (for example, a mold machine base 7 described below) having the mold mounted on and an injection machine base (for example, an injection machine base 8 described below) having the injection unit, the nozzle touch mechanism and the connecting member mounted on. The mold machine base or the stationary platen may have at least one first positioning pin hole (for example, a first positioning pin hole 71*a* described below) penetrating in an up-down direction (for example, an up-down direction D2 described below) for determining a position for connection with the injection machine base within a plane (for example, a plane orthogonal to the up-down direction D2 described below) in a transverse direction (for example, a direction orthogonal to the up-down direction D2 described below). At least one of the injection machine base and the connecting member may have at least one second positioning pin hole (for example, a second positioning pin hole 81*a* described below) penetrating in the up-down direction for determining a position for connection with the mold machine base within the plane in the transverse direction. The first positioning pin hole and the second positioning pin hole may be disposed so as to overlap with each other when the mold machine base and the injection machine base are disposed at proper relative positions. A positioning pin (for example, a positioning pin 91 described below) may be inserted through both of the first positioning pin hole and the second positioning pin hole, so as to position the mold machine base and the injection machine base in the transverse direction.

(4) In the injection molding machine according to (3), at least one of the mold machine base and the injection machine base may have a height adjustment mechanism (for example, height adjustment mechanisms 72, 82 described below).

(5) In the injection molding machine according to (3) or (4), the mold machine base and the injection machine base may respectively have machine base connecting parts (for example, machine base connecting parts 73, 83 described below) for connecting and fixing with each other, and in a state of the mold machine base and the injection machine base positioned by the positioning pin within the plane in the transverse direction, a machine base connecting tool (for example, a machine base connecting tool 92 described below) is fixed to both of the machine base connecting part of the mold machine base and the machine base connecting part of the injection machine base, so as to connect the mold machine base and the injection machine base.

(6) In the injection molding machine according to (1) or (2), the mold, the injection unit, the nozzle touch mechanism and the connecting member may be mounted on the common machine base (for example, a machine base 2 described below).

The present invention is to provide an injection molding machine, in which a stationary platen and a nozzle touch mechanism are connected by a connecting member having an arm part extending upward from a support base to be attached to a machine base, and in which a moment is hardly generated in a direction toward which the stationary platen falls even when the connecting member inclines upon generation of the nozzle touch force, thereby enabling to maintain and improve the effects by the connecting member of preventing the stationary platen from falling.

DETAILED DESCRIPTION OF THE INVENTION

Embodiments of the present invention will be described below with reference to the drawings.

First Embodiment

Figure 1:
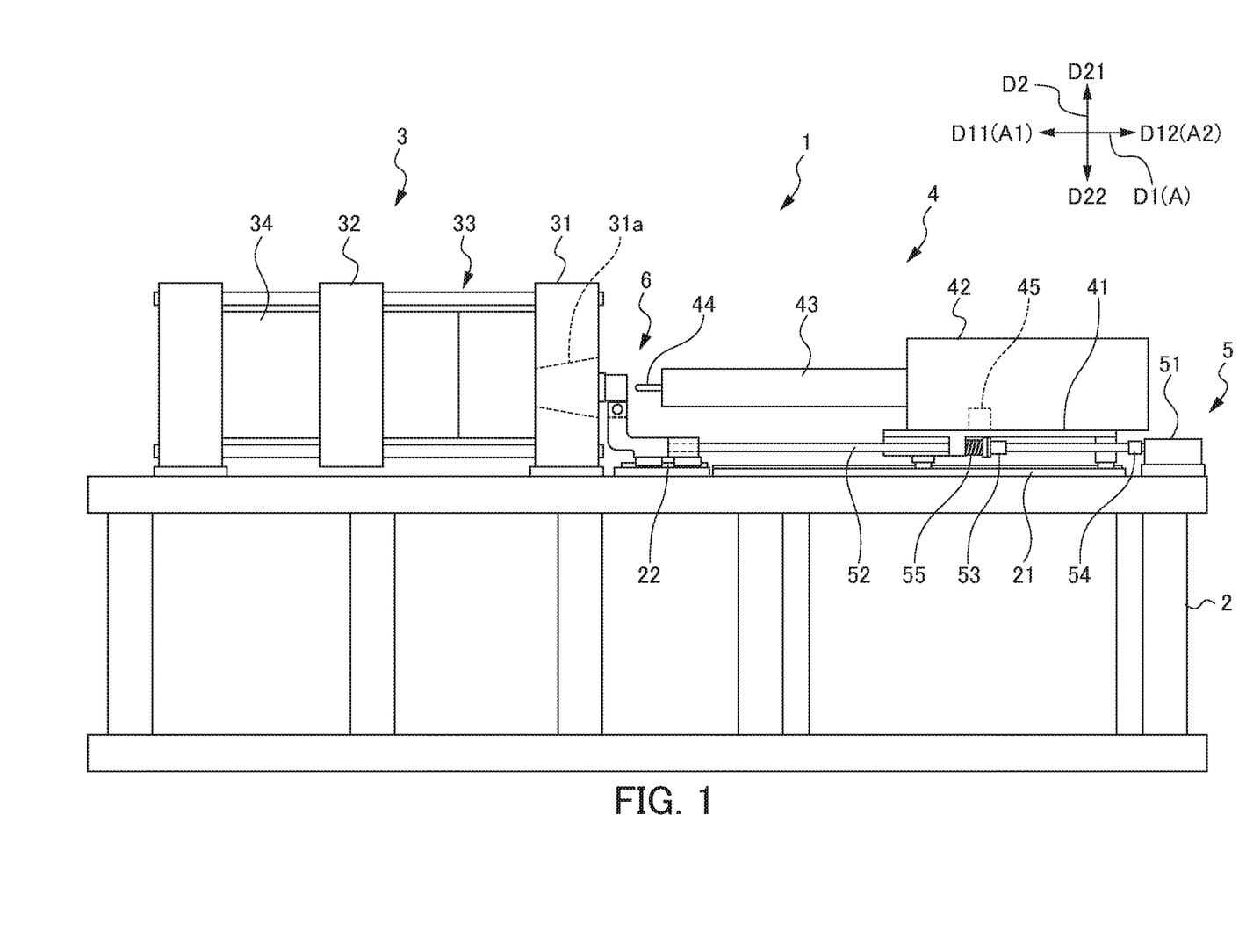
FIG. 1 is a side view illustrating an outline of an injection molding machine according to a first embodiment of the present invention.
Figure 2:
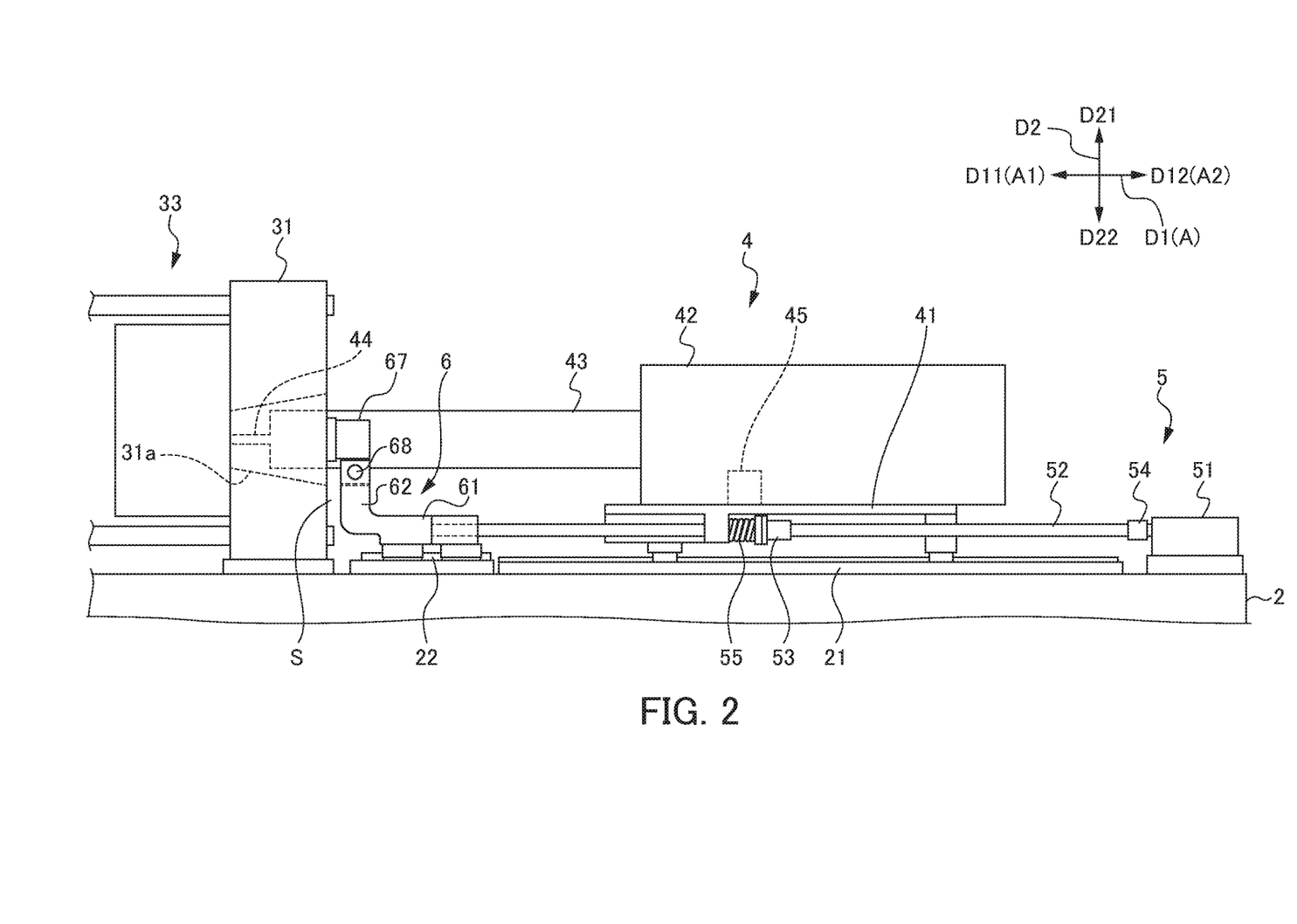
FIG. 2 is a side view for explaining a configuration of a nozzle touch mechanism of the injection molding machine shown in FIG. 1.
Figure 3:
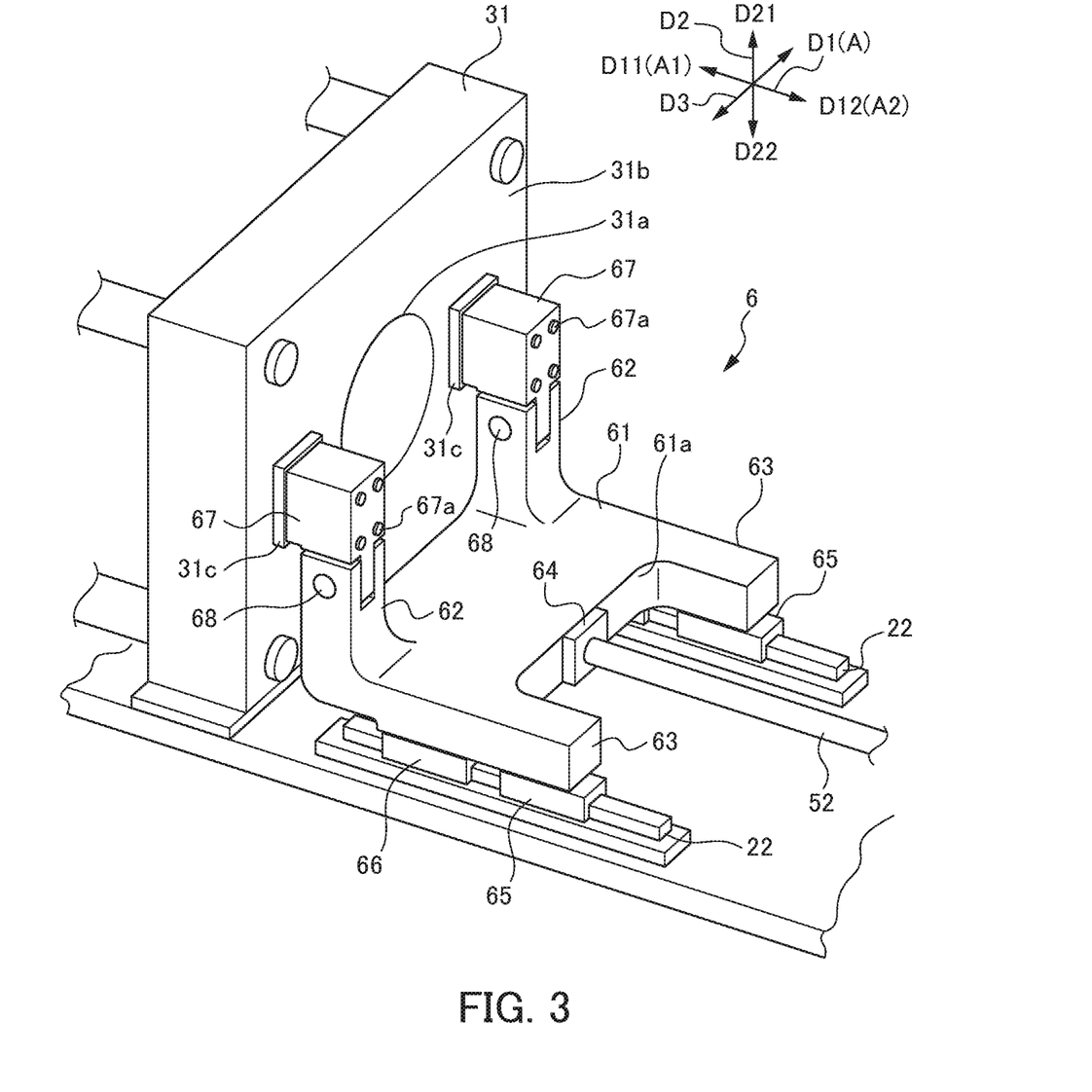
FIG. 3 is a perspective view for explaining a configuration of a connecting member of the injection molding machine shown in FIG. 1.

FIG. 1 is a side view illustrating an outline of an injection molding machine according to a first embodiment of the present invention. FIG. 2 is a side view for explaining a configuration of a nozzle touch mechanism of the injection molding machine shown in FIG. 1. FIG. 3 is a perspective view for explaining a configuration of a connecting member of the injection molding machine shown in FIG. 1.

It is noted that in the following drawings, the forward direction is denoted by D11, the rearward direction is denoted by D12, and the both directions are collectively referred to as "front-rear direction D1." In the present embodiment, the front-rear direction D1 corresponds to a moving direction A of an injection unit. The forward direction D11 corresponds to a direction A1 of approaching a mold (hereinafter also referred to as "approaching direction A1"). The rearward direction D12 corresponds to a direction A2 of separating from the mold (hereinafter also referred to as "separating direction A2"). The upward direction is denoted by D21, the downward direction is denoted by D22, and the both directions are collectively referred to as "up-down direction D2." The left-right direction is denoted by D3. In the present embodiment, "a transverse direction" is a direction orthogonal to the up-down direction D2, and "a plane in a transverse direction" is a plane orthogonal to the up-down direction D2.

The injection molding machine 1 of the first embodiment has, on a machine base 2, a clamping unit 3, an injection unit 4, a nozzle touch mechanism 5, and a connecting member 6.

The clamping unit 3 includes a mold 33 having a stationary platen 31 and a moving platen 32, and a mold driving mechanism 34. The clamping unit 3 is configured to clamp the mold 33 by moving the moving platen 32 in the direction of approaching the stationary platen 31 by the mold driving mechanism 34, and to open the mold 33 by moving the moving platen 32 in the direction of separating from the stationary platen 31. A nozzle insertion hole 31a is formed in a central portion of the stationary platen 31 (a central portion of a surface orthogonal to the moving direction A). A nozzle 44 of the injection unit 4 is inserted into the nozzle insertion hole 31a at the time of the nozzle touch described below. A spool (not shown) of the mold 33 against which the nozzle 44 is pressed at the time of injection molding faces the nozzle insertion hole 31a.

The injection unit 4 includes a base 41, an injection unit main body 42 disposed on the base 41, a cylinder part 43 extending from the injection unit main body 42 toward the clamping unit 3, and the nozzle 44 disposed at the tip of the cylinder part 43. The injection unit main body 42 is connected to the base 41 so as to be rotatable about a swivel pin 45 as a rotation center. The base 41 is slidably attached to a pair of parallel guide rails 21 disposed on the upper surface of the machine base 2. The guide rails 21 extend along the front-rear direction D1 (moving direction A).

The injection unit 4 is movable toward or away from the mold 33 by moving along the guide rails 21. The injection unit 4 moves in the direction A1 of approaching the mold 33 along the guide rails 21 by the nozzle touch mechanism 5 described below, thereby pressing the nozzle 44 against the spool of the mold 33 through the nozzle insertion hole 31a of the stationary platen 31. The injection unit 4 injects a molten material of resin or metal into the mold 33 in a state where the nozzle 44 is pressed against the spool of the mold 33.

The nozzle touch mechanism 5, which is disposed below the base 41 of the injection unit 4, includes a motor 51, a ball screw shaft 52, and a ball screw nut 53. One end of the ball screw shaft 52 extends more rearward than the injection unit 4 (in the rearward direction D12 in FIG. 1 and FIG. 2), and is connected to the rotor shaft of the motor 51 via a coupling 54. The other end of the ball screw shaft 52 extends more forward than the injection unit 4 (in the forward direction D11 in FIG. 1 and FIG. 2), and is connected to the connecting member 6 described below.

The ball screw nut 53 is screwed to the ball screw shaft 52, and connected to the base 41 via a spring 55 so as to be unrotatable with respect to the base 41 on which the injection unit main body 42 is disposed. Upon the rotation of the ball screw shaft 52, the ball screw nut 53 moves along the ball screw shaft 52, whereby the injection unit 4 moves along the guide rails 21 via the spring 55. As a result, the injection unit 4 advances toward the stationary platen 31 in the front-rear direction D1 (moving direction A), and the nozzle 44 touches the spool of the mold 33 through the nozzle insertion hole 31a of the stationary platen 31. The motor 51 further rotates to advance the ball screw nut 53, whereby the spring 55 is compressed and the compression reaction force of the spring 55 further advances the injection unit 4, resulting in the nozzle 44 becoming in the nozzle touch state where the nozzle 44 is pressed against the spool of the mold 33.

The connecting member 6 is disposed between the stationary platen 31 and the nozzle touch mechanism 5 so as to connect the stationary platen 31 and the nozzle touch mechanism 5. As shown in FIG. 3, the connecting member 6 is formed in a substantially L shape in a side view, having a support base 61 to be attached to the machine base 2, and a pair of right and left arm parts 62 rising upward (toward the upward direction D21) from the support base 61 in the side of the stationary platen 31 (the side of the forward direction D11).

A pair of support rails 22 is disposed on the machine base 2 on which the connecting member 6 is to be disposed, so as to extend in a direction parallel to the moving direction A of the injection unit 4 in nozzle touch operation. The support base 61 has a lateral width extending across the pair of support rails 22, and has a pair of protruding leg parts 63 respectively protruding from the both edge portions in the width direction (the left-right direction D3) of the support base 61 toward the side of the injection unit 4 (toward the side of the rearward direction D12). The protruding leg parts 63 are respectively disposed right above the support rails 22, and protrude from the support base 61 along the support rails 22.

The other end of the ball screw shaft 52 of the nozzle touch mechanism 5 is connected by a bearing part 64 to a rear end surface 61a of the support base 61 arranged between the protruding leg parts 63. That is, the bearing part 64 is disposed at a position recessed from the protruding leg parts 63, 63 toward the side of the stationary platen 31. It is noted that the bearing part 64 is one example of a first connecting part of the connecting member 6 in the present invention.

Two pairs of left and right guide blocks 65, 66 engaging with the support rails 22 are disposed on the lower surface of the connecting member 6. The connecting member 6 is attached to the machine base 2 by the guide blocks 65, 66. The guide blocks 65 are respectively disposed on the lower surface of the protruding leg parts 63, so as to be located at the most rear end side (in the side of the injection unit 4, in the side of the rearward direction D12) of the connecting member 6. The guide blocks 66 are respectively disposed in the forward end side (in the side of the stationary platen 31, in the side of the forward direction D11) of the support base 61 relative to the guide blocks 65. Accordingly, the support base 61 has the guide blocks 65 serving as attachment parts with respect to the machine base 2, at the positions in the side of the injection unit 4 (the side of the rearward direction D12) relative to the position of the bearing part 64 along the moving direction A. The guide blocks 65 are one example of an attachment part in the present invention.

The pairs of guide blocks 65, 66 are engaged with the support rails 22 so as to be movable in a direction parallel to the support rails 22 (the front-rear direction D1, the moving direction A), and to be immovable in other directions. For this reason, the connecting member 6 is attached to the machine base 2 so as to be immovable in the directions other than the direction parallel to the support rails 22.

The pair of arm parts 62 respectively rises substantially vertically upward (in the upward direction D21) from the support base 61 along a surface 31b in the side of the injection unit 4 (the side of the rearward direction D12) of the stationary platen 31. The upper portions of the arm parts 62 rising from the support base 61 respectively have platen connecting parts 67 to be connected to the stationary platen 31. The platen connecting parts 67 are one example of a first connecting part in the present invention.

The platen connecting parts 67 are disposed at substantially the same height as the nozzle 44 of the injection unit 4 so as to be symmetrical relative to the nozzle 44 in the left-right direction D3. The platen connecting parts 67 are disposed to be rotatable respectively about rotary pin shafts 68, not being fixed to the upper portions of the arm parts 62. The axial directions of the rotary pin shafts 68 are arranged in the direction (the left-right direction D3 shown in FIG. 3) orthogonal to the moving direction A of the injection unit 4. Accordingly, the platen connecting parts 67 are rotatable along the moving direction A at the upper portions of the arm parts 62.

The platen connecting parts 67 are respectively fixed by a plurality of bolts 67a to a pair of pedestals 31c disposed on the surface 31b of the stationary platen 31. The pair of pedestals 31c is disposed so as to be symmetrical relative to the nozzle insertion hole 31a in the left-right direction D3. Thus, the connecting member 6 is connected to the stationary platen 31 at substantially the same height as the nozzle 44 by the platen connecting parts 67. Accordingly, as in the conventional art, a bending moment due to the nozzle touch force is hardly generated in the stationary platen 31.

Each of the platen connecting parts 67 protrudes slightly longer to the side of the stationary platen 31 than each of the arm parts 62. Each of the pedestals 31c of the stationary platen 31 also protrudes slightly from the surface 31b of the stationary platen 31. Therefore, as shown in FIG. 2, a predetermined space S is formed between the surface 31b of the stationary platen 31 and the arm parts 62 of the connecting member 6 in the state where the platen connecting parts 67 are fixed to the pedestals 31c. Accordingly, the connecting member 6 and the stationary platen 31 do not interfere with each other except for the platen connecting parts 67 and the pedestals 31c.

Figure 4:
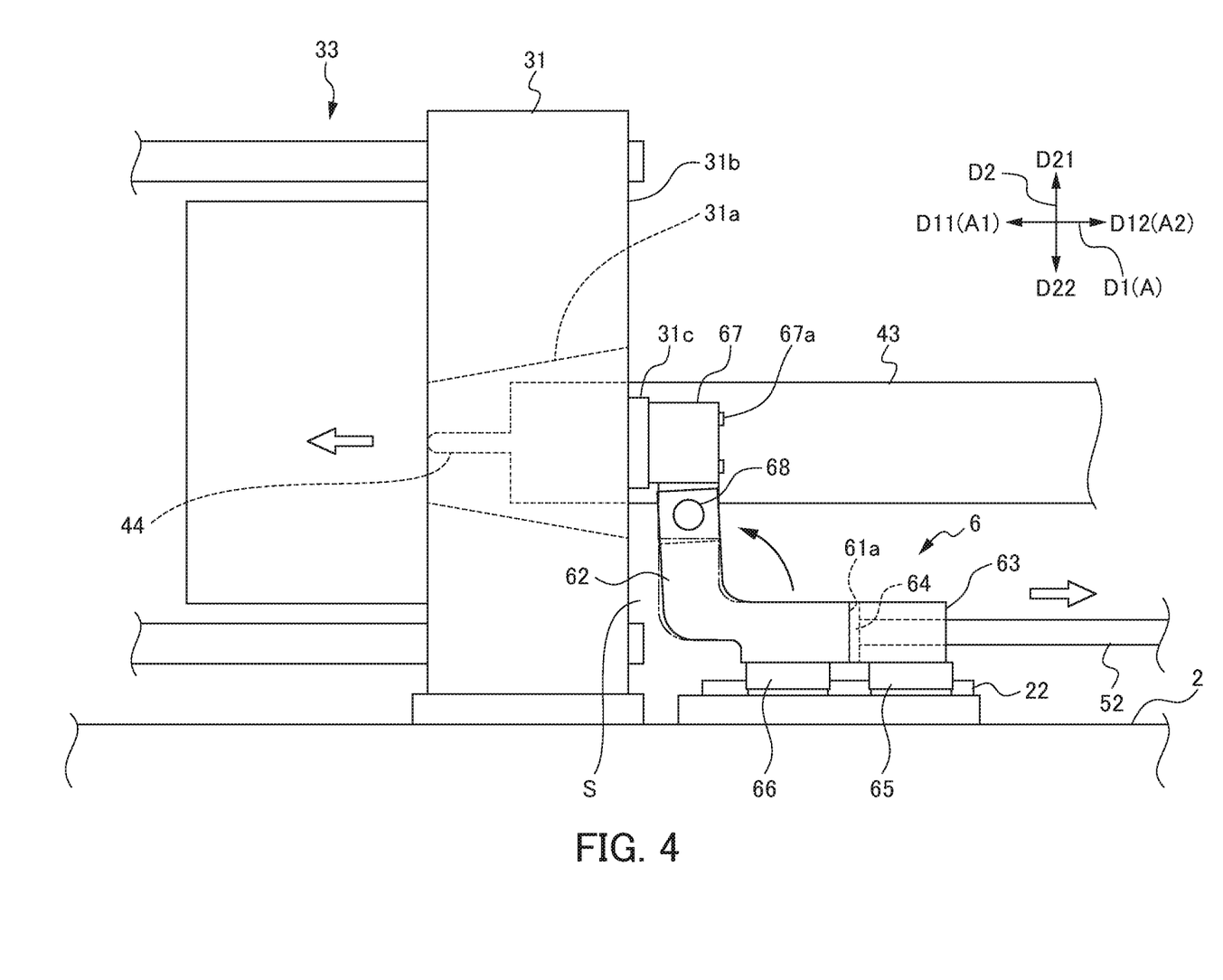
FIG. 4 is an explanatory drawing for explaining the action and effects of the connecting member.

The action and effects of the connecting member 6 having the rotatable platen connecting parts 67 as described above are further explained below with reference to FIG. 4. FIG. 4 is an explanatory drawing for explaining the action and effects of the connecting member 6. Upon the rotation of the ball screw shaft 52 of the nozzle touch mechanism 5, the injection unit 4 advances in the direction A1 of approaching the mold 33. When the nozzle 44 touches the spool of the mold 33 through the nozzle insertion hole 31a of the stationary platen 31, the nozzle touch force is generated. Due to the nozzle touch force, a strong tensile force acts on the connecting member 6. At this time, the connecting member 6 may, in some cases, tend to slightly incline to fall to the side of the stationary platen 31 toward the forward direction D11, as shown by the arc-shaped arrow in FIG. 4, due to a difference in height between the position of the bearing part 64 of the connecting member 6 and each of the positions of the platen connecting parts 67. In addition, the connecting member 6 may, in some cases, tend to incline to the side of the stationary platen 31 toward the forward direction D11, due to slight deformation of the arm parts 62 of the connecting member 6 when the nozzle touch force is generated.

When the force that the connecting member 6 tends to incline is generated, a moment is generated in the direction toward which the stationary platen 31 falls in the conventional art. On the other hand, the platen connecting parts 67 of the connecting member 6 in the present embodiment are rotatable along the moving direction A of the injection unit 4. Thus, the moment to be generated by the inclination of the connecting member 6 is hardly transmitted to the platen connecting parts 67. That is, the moment to be generated by the inclination of the connecting member 6 is converted into the rotation of the arm parts 62 and the support base 61 around the rotary pin shafts 68, thereby hardly generating the moment via the platen connecting parts 67 in the direction toward which the stationary platen 31 falls. Accordingly, the injection molding machine 1 having the connecting member 6 is capable of maintaining and improving the effects inherent in the connecting member 6, of preventing the stationary platen 31 from falling down.

The connecting member 6 described in the present embodiment has the guide blocks 65 serving as the attachment parts with respect to the machine base 2, at positions in the side of the injection unit 4 relative to the bearing part 64, thereby enabling to effectively suppress excessive inclination of the connecting member 6 itself. That is, when the tensile force by the ball screw shaft 52 acts on the bearing part 64, the connecting member 6 tends to incline toward the direction in which the sides of the arm parts 62 fall toward the side of the stationary platen 31. As a result, the sides of the protruding leg parts 63 tend to incline in such a direction as to be lifted up from the machine base 2. However, the guide blocks 65 are attached immovably in such a direction as to be lifted up with respect to the support rails 22 of the machine base 2 in the rearward side relative to the bearing part 64, thereby enabling to effectively suppress the movement of the excessive inclination of the connecting member 6. Accordingly, combination of the configuration of the rotating structure of the platen connecting parts 67 and the configuration of the prevention structure of the excessive inclination of the connecting member 6 by the guide blocks 65 enables to further maintain and improve the effects by the connecting member 6 of preventing the stationary platen 31 from falling.

It is noted that although the inclination of the connecting member 6 is extremely small, the inclination in FIG. 4 is illustrated with exaggeration for ease of understanding. In an example, the guide block of the connecting member 6 may be one block extending in the front-rear direction of the support base 61, or may be divided into three or more blocks. In order to prevent the excessive inclination of the connecting member 6, at least a part of a guide block serving as an attachment part needs to be disposed at a position in the side of the injection unit 4 (the side of the rearward direction D12) relative to the bearing part 64.

Second Embodiment

Figure 5:
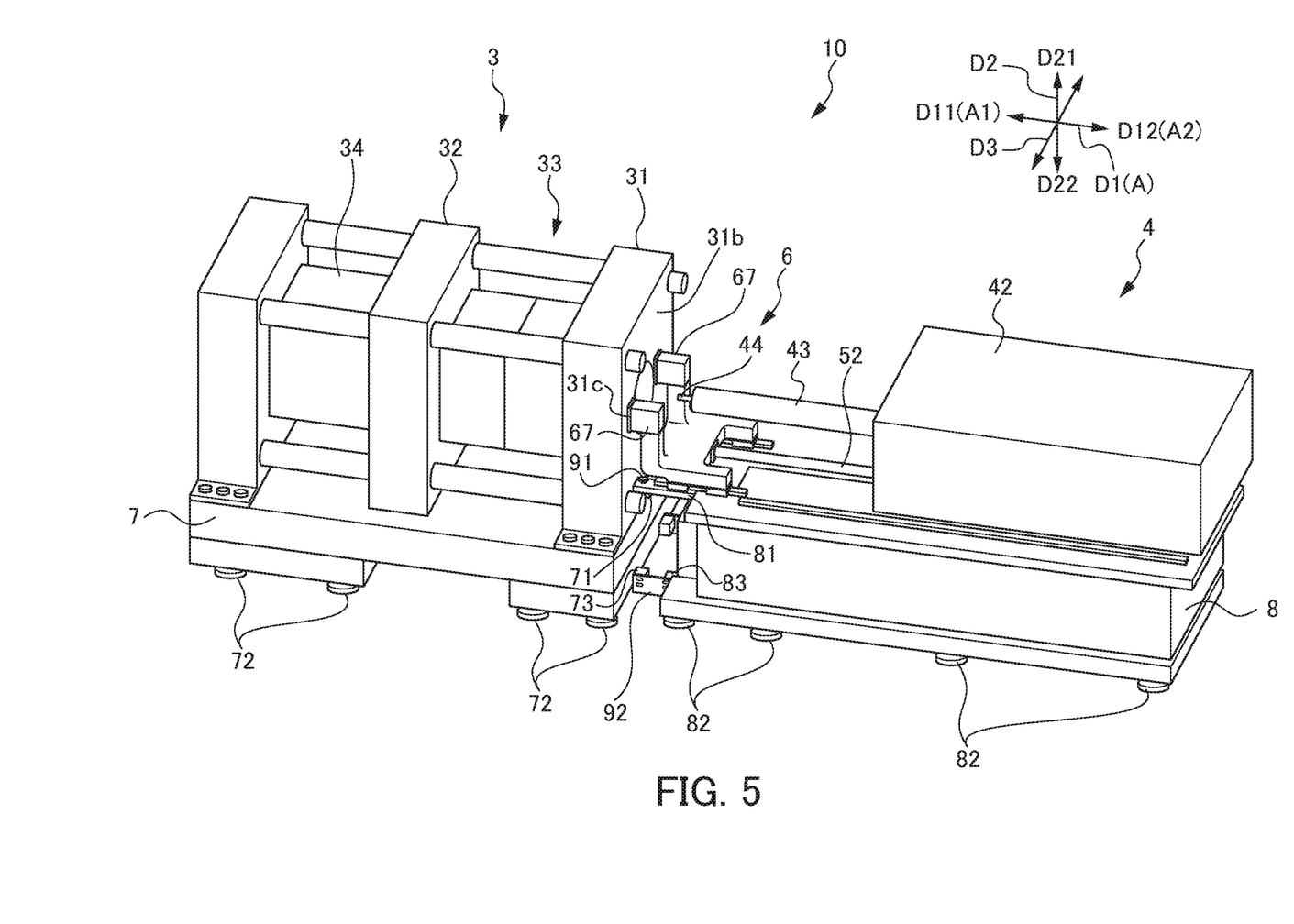
FIG. 5 is a perspective view illustrating an overall configuration of an injection molding machine according to a second embodiment of the present invention.
Figure 6:
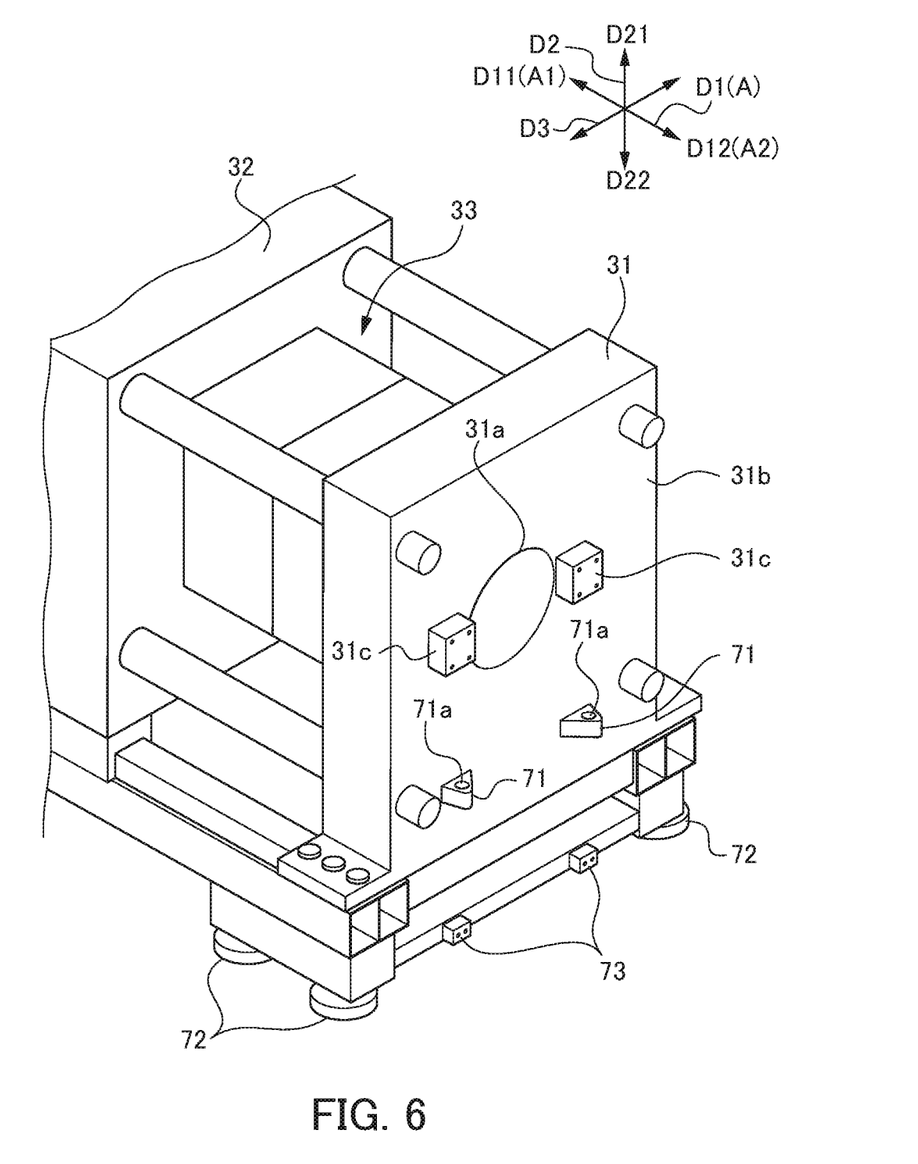
FIG. 6 is a perspective view of a mold machine base in the injection molding machine shown in FIG. 5.
Figure 7:
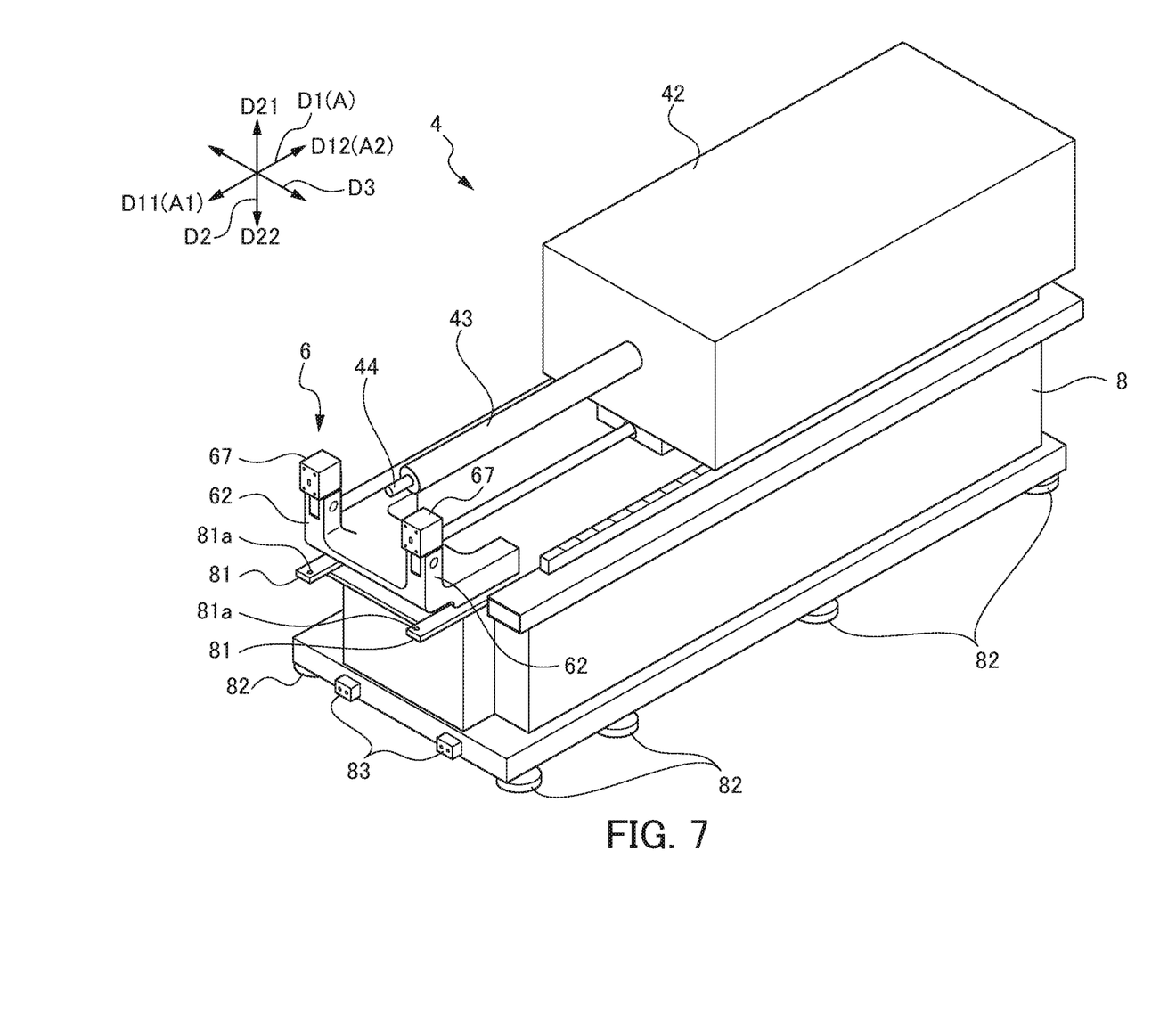
FIG. 7 is a perspective view of an injection machine base in the injection molding machine shown in FIG. 5.

Each of FIG. 5 to FIG. 7 shows an injection molding machine according to the second embodiment of the present invention. FIG. 5 is a perspective view illustrating an overall configuration of the injection molding machine according to the second embodiment of the present invention. FIG. 6 is a perspective view of a mold machine base in the injection molding machine shown in FIG. 5. FIG. 7 is a perspective view of an injection machine base in the injection molding machine shown in FIG. 5. Since the portions given the same reference numerals as those of the injection molding machine 1 according to the first embodiment shown in FIG. 1 to FIG. 4 indicate the portions having the same configurations, the description in the first embodiment is cited for the explanation thereof, and the description thereof is omitted.

The machine base of an injection molding machine 10 according to the second embodiment is divided into a mold machine base 7 on which the clamping unit 3 having the mold 33 is mounted, and an injection machine base 8 on which the injection unit 4, the nozzle touch mechanism 5 and the connecting member 6 are mounted. The mold machine base 7 and the injection machine base 8 are connected to each other, whereby the clamping unit 3 and the injection unit 4 are disposed at relatively proper positions. Thus, the mold machine base 7 and the injection machine base 8 are separated at the time of maintenance, as an example, thereby enabling to perform individual maintenance of the clamping unit 3, the injection unit 4 and the like. In addition, each of the clamping unit 3, the injection unit 4 and the like allows easy access.

The connection structure between the mold machine base 7 and the injection machine base 8 is described below. As shown in FIG. 6, the stationary platen 31 on the mold machine base 7 has a positioning protrusion 71 protruding from the surface 31b toward the rearward direction D12. In the present embodiment, the pair of positioning protrusions 71 is disposed in the left-right direction D3 so as to be located right below the pair of pedestals 31c on the surface 31b of the stationary platen 31. Each of the positioning protrusions 71 has a first positioning pin hole 71a penetrating in the up-down direction D2. The first positioning pin hole 71a is, as described below, used for determining the position for connection with the injection machine base 8, within a plane in the transverse direction (a plane orthogonal to the up-down direction D2).

On the other hand, as shown in FIG. 7, the injection machine base 8 has a positioning protruding plate 81 protruding toward the forward direction D11 from the surface to be joined to the mold machine base 7. In the present embodiment, the pair of the positioning protruding plates 81 is disposed in the left-right direction D3, so as to be located right below the pair of arm parts 62 of the connecting member 6. Each of the positioning protruding plates 81, which is formed of a flat plate, has a second positioning pin hole 81a penetrating the flat plate in the up-down direction D2. The second positioning pin hole 81a is, as described below, used for determining the position for connection with the mold machine base 7, within the plane in the transverse direction.

Figure 8:
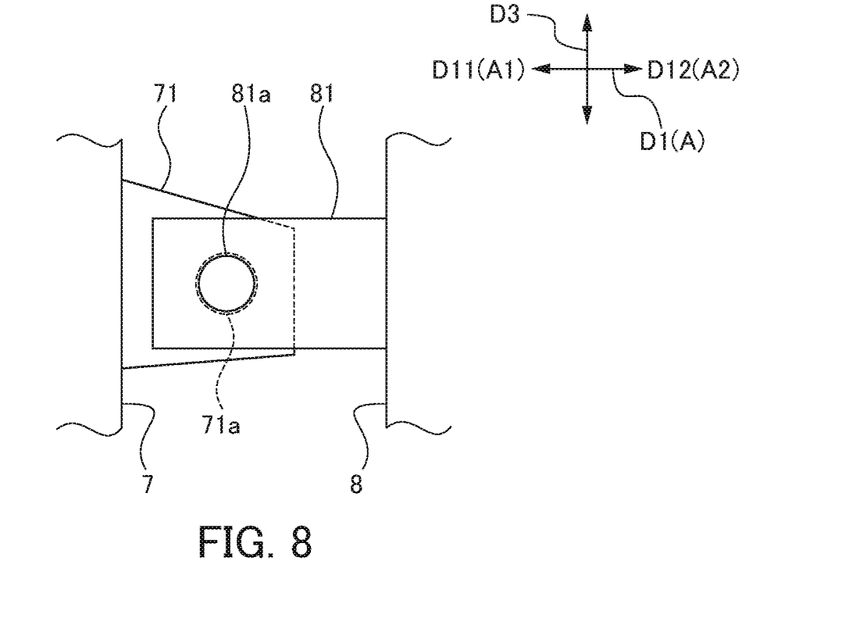
FIG. 8 is a plan view of a part for explaining positional relations in which a first positioning pin hole on the side of the mold machine base and a second positioning pin hole on the side of the injection machine base overlap with each other.

The distance between the pair of first positioning pin holes 71a, 71a is equal to the distance between the pair of second positioning pin holes 81a, 81a. The positioning protrusions 71 and the positioning protruding plates 81 are disposed so as to overlap with each other in the up-down direction D2. Accordingly, the first positioning pin holes 71a and the second positioning pin holes 81a are disposed to overlap with each other when the mold machine base 7 and the injection machine base 8 are set in proper relative positions as shown in FIG. 8 and FIG. 9.

It is noted that the proper relative positions of the mold machine base 7 and the injection machine base 8 are such relative positions of the mold machine base 7 and the injection machine base 8, that the nozzle touch mechanism 5 on the injection machine base 8 is driven to press the nozzle 44 of the injection unit 4 against the spool of the mold 33 on the mold machine base 7, thereby allowing normal injection and forming of a molten material.

Figure 9:
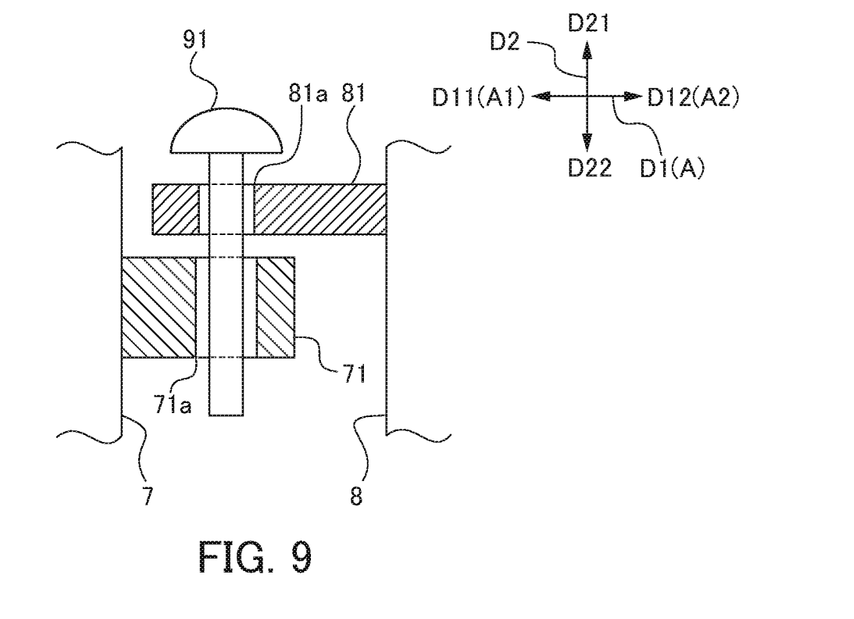
FIG. 9 is a cross-sectional view of a part for explaining positional relations in which the first positioning pin hole on the side of the mold machine base and the second positioning pin hole on the side of the injection machine base overlap with each other.

In the state where the first positioning pin holes 71a and the second positioning pin holes 81a overlap with each other, a positioning pin 91 is inserted through both of each of the first positioning pin holes 71a and each of the second positioning pin holes 81a, as shown in FIG. 9. When the positioning pin 91 is inserted, the relative positions of the mold machine base 7 and the injection machine base 8 are temporarily fixed within the plane in the transverse direction. That is, when the positioning pin 91 is inserted, the mold machine base 7 and the injection machine base 8 are temporarily positioned in the proper relative positions. In this state, the respective platen connecting parts 67 of the connecting member 6 and the respective pedestals 31c of the stationary platen 31 are joined with each other, and then fixed by bolts (not shown). As a result, the nozzle touch mechanism 5 and the stationary platen 31 are connected via the connecting member 6.

In the case where a machine base is divided into the mold machine base 7 and the injection machine base 8 as in the present embodiment, the connecting member 6 and the stationary platen 31 need to be connected to each other so that the nozzle touch force uniformly acts on the respective platen connecting parts 67 of the connecting member 6. In the injection molding machine 10, the connecting member 6 and the stationary platen 31 are enabled to be connected to each other when the mold machine base 7 and the injection machine base 8 are in a temporarily fixed state at the proper relative positions parallel to the moving direction A, not being inclined with respect to the moving direction A. Therefore, the nozzle touch force is uniformly received by the pair of platen connecting parts 67, 67 and the pair of arm parts 62, 62 of the connecting member 6. Accordingly, the configuration of the rotating structure of the platen connecting parts 67 enables to further secure the effects to maintain and improve the effects by the connecting member 6 of preventing the stationary platen 31 from falling.

The positioning protrusions 71 may be disposed on the mold machine base 7. The positioning protruding plates 81 may be disposed on the connecting member 6. Each of the number of the positioning protrusions 71 and the number of the positioning protruding plates 81 may be at least one, not being limited to two. However, from the viewpoint of not only determining the distance between the mold machine base 7 and the injection machine base 8, but also facilitating the positioning of the mold machine base 7 and the injection machine base 8 on a straight line parallel to the moving direction A, at least one pair of the positioning protrusions 71 and at least one pair of the positioning protruding plates 81 may be preferably provided, as described in the present embodiment. The specific shapes of the positioning protrusions 71 and the positioning protruding plates 81 may be any shapes, not being limited to the shapes shown in the figures, as long as each of the positioning protrusions 71 may have the first positioning pin hole 71a and each of the positioning protruding plates 81 may have the second positioning pin hole 81a.

As shown in FIG. 5 to FIG. 7, the mold machine base 7 and the injection machine base 8 may have height adjustment mechanisms 72, 82, respectively. The mold machine base 7 and the injection machine base 8 respectively having the height adjustment mechanisms 72, 82 are capable of not only performing positioning within the plane in the transverse direction, but also performing positioning in the height direction (up-down direction D2). This allows the mold machine base 7 and the injection machine base 8 to be positioned at the proper relative positions, even when the mounting surface on which the injection molding machine 10 is mounted has variation in height. Accordingly, the connecting member 6 and the stationary platen 31 are enabled to be properly connected to each other.

The height adjustment mechanisms 72, 82 described in the present embodiment are respectively configured with mounts which are to be attached to the lower surfaces of the mold machine base 7 and the injection machine base 8 and rotated for adjusting the heights. The height adjustment mechanism may be, for example, a height adjustable anchor, not being limited to such a mount. The height adjustment mechanism may be disposed on only either one of the mold machine base 7 and the injection machine base 8.

The mold machine base 7 and the injection machine base 8 respectively have machine base connecting parts 73, 83 at positions lower than the positioning protrusions 71 and the positioning protruding plates 81. The machine base connecting parts 73, 83 are connecting parts for connecting and integrally fixing the mold machine base 7 and the injection machine base 8. The machine base connecting part 73 of the mold machine base 7 protrudes toward the injection machine base 8 from the surface of the mold machine base 7 facing the injection machine base 8. On the other hand, the machine base connecting part 83 of the injection machine base 8 protrudes toward the mold machine base 7 from the surface of the injection machine base 8 facing the mold machine base 7. In the present embodiment, the pair of machine base connecting parts 73 and the pair of machine base connecting parts 83 are disposed.

As shown in FIG. 5, the mold machine base 7 and the injection machine base 8 in the temporarily positioned state within the plane in the transverse direction by the positioning pins 91 are bolted by machine base connecting tools 92 each extending so as to cover each of the machine base connecting parts 73 of the mold machine base 7 and each of the machine base connecting parts 83 of the injection machine base 8. The machine base connecting tools 92 integrally connect the mold machine base 7 and the injection machine base 8 in the temporary positioned state, so as to fix the connection state. The machine base connecting parts 73 and the machine base connecting parts 83 are connected by the machine base connecting tools 92 in such a way, thereby enabling to maintain the relative positions of the mold machine base 7 and the injection machine base 8 in the appropriate positions. Accordingly, the connection state between the stationary platen 31 and the connecting member 6 is also maintained in the proper state.

The present invention is not limited to the above-described embodiments. Although the pairs of the machine base connecting parts 73, 83 are disposed in the present embodiments, each of the numbers of the machine base connecting parts 73, 83 may be, for example, one or three, not being limited to two. The machine base connecting tool 92 may be fixed in advance to either one of the machine base connecting parts 73 of the mold machine base 7 and the machine base connecting parts 83 of the injection machine base 8, or may be fixed in advance to each of the machine base connecting parts 73 of the mold machine base 7 and the machine base connecting parts 83 of the injection machine base 8 so that the both machine base connecting tools 92 are connected integrally. The up-down direction D2 is not limited to the vertical direction. The transverse direction is not limited to the direction (horizontal direction) orthogonal to the vertical direction. The front-rear direction D1 is not limited to the direction orthogonal to the vertical direction.

EXPLANATION OF REFERENCE NUMERALS

1 INJECTION MOLDING MACHINE
2 MACHINE BASE
31 STATIONARY PLATEN
33 MOLD
4 INJECTION UNIT
44 NOZZLE
5 NOZZLE TOUCH MECHANISM
6 CONNECTING MEMBER
61 SUPPORT BASE
62 ARM PART
64 BEARING PART (FIRST CONNECTING PART)
65 GUIDE BLOCK (ATTACHMENT PART)
67 PLATEN CONNECTING PART (SECOND CONNECTING PART)
7 MOLD MACHINE BASE
71a FIRST POSITIONING PIN HOLE
72 HEIGHT ADJUSTMENT MECHANISM

73 MACHINE BASE CONNECTING PART
8 INJECTION MACHINE BASE
81a SECOND POSITIONING PIN HOLE
82 HEIGHT ADJUSTMENT MECHANISM
83 MACHINE BASE CONNECTING PART
91 POSITIONING PIN
92 MACHINE BASE CONNECTING TOOL

What is claimed is:

1. An injection molding machine comprising, on a machine base:
   a mold having a stationary platen;
   an injection unit disposed to be capable of approaching or separating from the mold, the injection unit having a nozzle for injecting a molten material into the mold in a state of the nozzle being pressed against the mold;
   a nozzle touch mechanism for pressing the nozzle against the mold by applying a driving force to the injection unit to move the injection unit in a direction of approaching the mold; and
   a connecting member for connecting the nozzle touch mechanism and the stationary platen, wherein
   the connecting member has a support base to be attached to the machine base and an arm part rising upward from the support base in a side of the stationary platen, and also has a first connecting part to be connected to the nozzle touch mechanism on the support base, and a second connecting part to be connected to the stationary platen on an upper part of the arm part,
   the injection molding machine is configured so that a nozzle touch force for pressing the nozzle against the mold is transmitted to the nozzle touch mechanism via the stationary platen and the connecting member, and
   the second connecting part of the connecting member is disposed to be rotatable in a direction along a moving direction of the injection unit around a rotary pin shaft having an axial direction arranged in a width direction of the support base.

2. The injection molding machine according to claim 1, wherein
   the support base of the connecting member is attached to the machine base by an attachment part at a position at least in a side of the injection unit relative to a position of the first connecting part along the moving direction of the injection unit.

3. The injection molding machine according to claim 1, wherein
   the machine base is divided into a mold machine base having the mold mounted on and an injection machine base having the injection unit, the nozzle touch mechanism and the connecting member mounted on,
   the mold machine base or the stationary platen has at least one first positioning pin hole penetrating in an up-down direction for determining a position for connection with the injection machine base within a plane in a transverse direction,
   at least one of the injection machine base and the connecting member has at least one second positioning pin hole penetrating in the up-down direction for determining a position for connection with the mold machine base within the plane in the transverse direction,
   the first positioning pin hole and the second positioning pin hole are disposed so as to overlap with each other when the mold machine base and the injection machine base are disposed at proper relative positions, and
   a positioning pin is inserted through both of the first positioning pin hole and the second positioning pin hole, so as to position the mold machine base and the injection machine base in the transverse direction.

4. The injection molding machine according to claim 3, wherein
   at least one of the mold machine base and the injection machine base has a height adjustment mechanism.

5. The injection molding machine according to claim 3, wherein
   the mold machine base and the injection machine base respectively have machine base connecting parts for connecting and fixing with each other, and
   in a state of the mold machine base and the injection machine base positioned by the positioning pin within the plane in the transverse direction, a machine base connecting tool is fixed to both of the machine base connecting part of the mold machine base and the machine base connecting part of the injection machine base, so as to connect the mold machine base and the injection machine base.

6. The injection molding machine according to claim 1, wherein
   the mold, the injection unit, the nozzle touch mechanism and the connecting member are mounted on the machine base.

* * * * *